(No Model.)
R. L. PRANGE.
ICE CREAM MOLD.
No. 571,171. Patented Nov. 10, 1896.
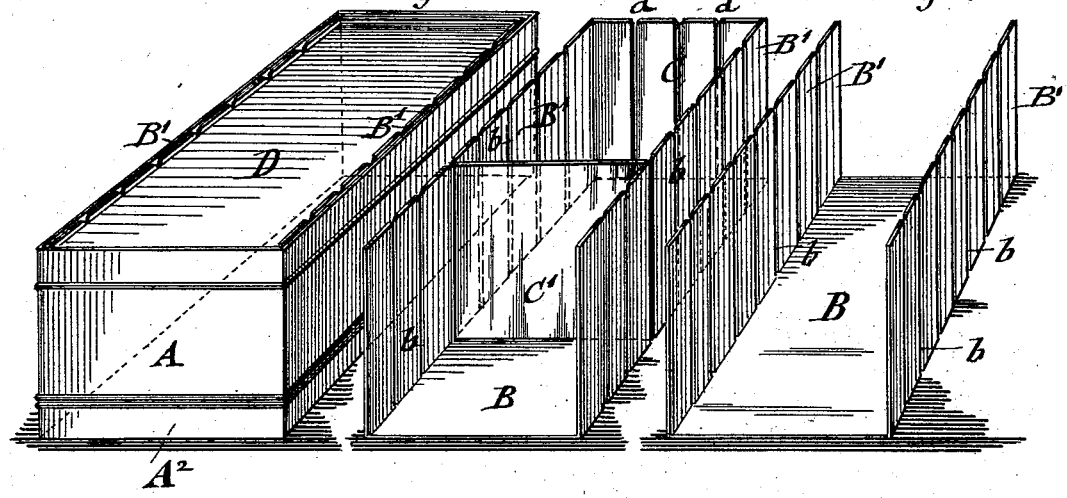
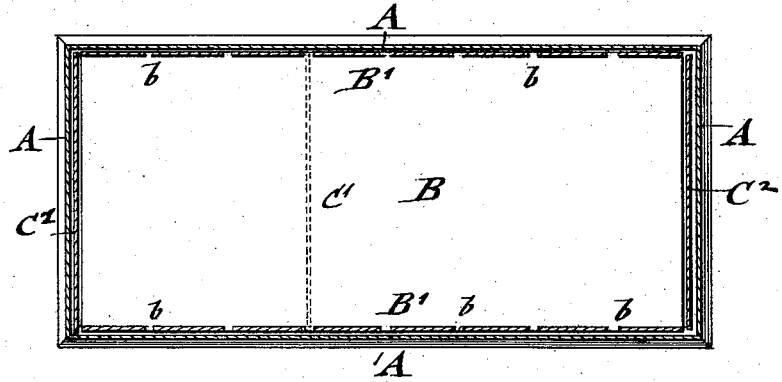
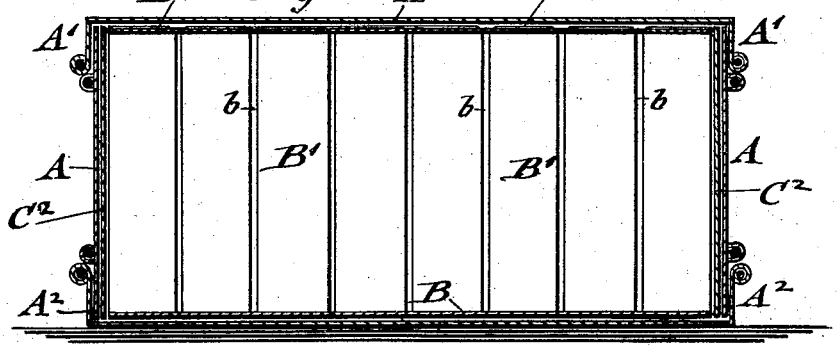
WITNESSES:
R. F. Pelouza.
Geo. L. Wheelock.
INVENTOR
Robert L. Prange
BY
Raegener
ATTORNEYS.

UNITED STATES PATENT OFFICE.

ROBERT L. PRANGE, OF NEW YORK, N. Y., ASSIGNOR OF ONE-HALF TO WILLIAM GREVEL, OF SAME PLACE.

ICE-CREAM MOLD.

SPECIFICATION forming part of Letters Patent No. 571,171, dated November 10, 1896.

Application filed September 2, 1896. Serial No. 604,603. (No model.)

*To all whom it may concern:*

Be it known that I, ROBERT L. PRANGE, a citizen of the United States, residing in the city, county, and State of New York, have invented certain new and useful Improvements in Ice-Cream Molds, of which the following is a specification.

This invention relates to a mold for ice-cream or other substances of any kind or description, which, when solidified by freezing or otherwise, are to be subdivided into portions or slabs of suitable size and dimensions, and in which an inner mold-section is used which is made to fit snugly within the outer mold or box, and which is put into the said outer box before the ice-cream or other substance to be solidified is placed therein, so that on removing the solidified block with the inner mold-section from the outer box or casing the said block may be cut off in regular sections of suitable size and dimensions from time to time, as required for use. When a portion of the block has been removed, the remaining portion of the block, together with the removable inner mold-section, is replaced in the outer box or casing and returned into the refrigerating apparatus, so as to be kept in good condition for further use.

The invention consists, to these ends, of a mold proper, which comprises an outer box or casing of suitable form or size, a removable inner mold-section fitting snugly within the box or casing and provided with parallel upright slits in its sides and ends, and one or more removable division-plates, which can be inserted into the slits of the inner section transversely or longitudinally, so as to cut off and separate uniform slabs or portions of the solidified block.

In the accompanying drawings, Figure 1 is a perspective view of my improved ice-cream mold with the inner removable mold-section, showing the cover of the mold removed and disclosing a block of ice-cream or other substance. Fig. 2 is a perspective view of the preferred form of the removable inner mold-section, showing in full lines a slitted end wall. Fig. 3 is a perspective view of a modified form of the inner mold-section. Fig. 4 is a plan of my improved ice-cream mold in section; and Fig. 5 is a vertical longitudinal section of the same, showing the division-plates for dividing the block.

Similar letters of reference indicate corresponding parts.

In the drawings, A represents an ordinary oblong ice-cream mold or box, which is either provided with a removable lid or cover A', or with a removable bottom $A^2$, or with both lid A' and section $A^2$ removable, as shown in Fig. 5. Fitting snugly in the box or casing A is a removable inner mold-section B of sheet metal or other suitable material, the side walls B' of which are provided with parallel upwardly-extending slits $b$.

In Fig. 2 one end of the removable inner section is shown as completely closed by an integral end portion or wall C, while the opposite end is open and closed by means of a removable division-plate C'.

In Figs. 3, 4, and 5 the removable inner mold-section is shown U-shaped in cross-section, both ends being open and the sides B' slitted in the same manner as is the mold-section shown in Fig. 2.

In Figs. 4 and 5 the open ends of the removable inner mold-section B are closed by two removable division-plates C' $C^2$. The closed end C of the inner mold-section B may be likewise provided with parallel upwardly-extending slits $d$, as shown in full lines in Fig. 2. The slits of the end wall C serve for inserting a longitudinal division-plate D in the same manner as the transverse division-plates C' and $C^2$.

My improved ice-cream mold is used as follows: The removable inner mold-section B is placed into the outer mold or box A and the open end or ends of the same closed by the plates C' $C^2$. The frozen substance, such as ice-cream, is then placed into the removable inner mold-section. The longitudinal division-plate D is then placed on the frozen block and the lid placed on the outer box or casing. The consumer on receiving the mold A opens the same and removes the inner mold-section B, containing the block of ice-cream, from the outer mold or casing A. A knife or one of the division-plates C' or $C^2$ is then passed down through the transversely-opposite slits $b$ or the longitudinal division-plate D is passed longitudinally down in one of the end slits $d$, so as to cut off a slab or section of the block of ice-cream or other solidified substance. The knife or removable division-plate C' or C² is then passed down into the adjacent opposite slits, so as to cut off another slab, and so on until as many slabs as are required are separated from the block.

When the whole block is not immediately required for use, the partition-plate C' or C² is left in the slits next to the unused portion of the block, so as to retain the remaining portion of the block in the inner mold-section, which is then replaced in the outer mold or box A and returned to the refrigerating apparatus, so as to be kept in good condition until required for use.

The advantages of my improved ice-cream mold are, first, that it obviates the removing of the frozen block from the mold by heating the mold; second, that it facilitates the cutting of the block either transversely or longitudinally into slabs or pieces of equal sizes and practically equal weight, and, third, that it facilitates the removal of the slabs or pieces of ice-cream from the mold, whereby the mold is of special advantage for ice-cream dealers, restaurants, hotels, &c., as by it ice-cream or other frozen substances can be supplied in uniform portions in a quick and convenient manner.

Having thus described my invention, I claim as new and desire to secure by Letters Patent—

1. A mold, consisting of an outer casing or box provided with a removable cover, and a removable inner mold-section, being open at the top and fitted snugly within the outer casing or box, and provided with parallel slits in its sides, substantially as set forth.

2. A mold, consisting of an outer casing or box provided with a removable cover, a removable inner mold-section, fitting snugly within the outer casing or box and being open at the top and provided with parallel slits in its sides, and a removable division-plate adapted to be inserted into the slits, substantially as set forth.

3. A mold, consisting of an outer casing or box provided with a removable cover, a removable inner mold-section fitting snugly within the outer casing or box and being open at the top and one end and provided with parallel slits in its sides and its closed end, and a removable division-plate adapted to be inserted into the slits of the side walls or end of the inner mold-section, substantially as set forth.

In testimony that I claim the foregoing as my invention I have signed my name in presence of two subscribing witnesses.

ROBERT L. PRANGE.

Witnesses:
PAUL GOEPEL,
GEO. L. WHEELOCK.